(12) United States Patent
Hosomi (10) Patent No.: US 6,373,506 B1
(45) Date of Patent: Apr. 16, 2002

(54) OBJECT ALIGNMENT CONTROLLER AND OBJECT ALIGNMENT CONTROLLING METHOD

(75) Inventor: Itaru Hosomi, Tokyo (JP)

(73) Assignee: NEC Corporation (JP)

(*) Notice: Subject to any disclaimer, the term of this patent is extended or adjusted under 35 U.S.C. 154(b) by 0 days.

(21) Appl. No.: 09/346,054

(22) Filed: Jul. 7, 1999

(30) Foreign Application Priority Data

Jul. 24, 1998 (JP) .......................................... 10-209332

(51) Int. Cl.7 ................................................. G09G 5/00
(52) U.S. Cl. ........................ 345/806; 345/698; 345/699
(58) Field of Search ................................ 345/531, 564, 345/565, 698, 699, 718, 806

(56) References Cited

U.S. PATENT DOCUMENTS 5,796,401 A * 8/1998 Winer .......................... 345/433
6,313,851 B1 * 11/2001 Matthews, III et al. ..... 345/718

FOREIGN PATENT DOCUMENTS

| JP | 62-145480 | 6/1987 |
|---|---|---|
| JP | 63-118830 | 5/1988 |
| JP | 5-324246 | 12/1993 |
| JP | 6-332656 | 12/1994 |
| JP | 7-146765 | 6/1995 |
| JP | 8-6750 | 1/1996 |
| JP | 9-91113 | 4/1997 |
| JP | 10-49336 | 2/1998 |
| JP | 10-133973 | 5/1998 |
| JP | 11-66101 | 3/1999 |
| WO | 94/27278 | 11/1994 |
| WO | 95/25299 | 9/1995 |

OTHER PUBLICATIONS

Japanese Office Action issued Aug. 8, 2000 in a related application with English–language translation of relevant portions.

* cited by examiner

Primary Examiner—Ba Huynh
(74) Attorney, Agent, or Firm—Ostrolenk, Faber, Gerb & Soffen, LLP (57) ABSTRACT

In a case where computer software containing a plurality of objects is displayed on a display device, a structure of to-be-displayed objects is analyzed, and, for example, the analyzed structure which is represented in a tree structure is retained in an object structure retaining section. A required area calculating section obtains a size of an area required for displaying the objects in the structure which is retained by the object structure retaining section, and an area comparing section compares the obtained size of the required area with a size of a displayable area which is pre-stored. An alignment change process determining section determines whether to change an alignment of the objects, based on the comparison result. If the alignment change process determining section determines not to change the alignment, computer software in the structure of the objects is displayed on the display device. On the contrary, if the alignment change process determining section determines to change the alignment, an alignment changing section changes the structure of the objects for performing the same process based on the changed structure of the objects. Not only the alignment of the objects, a size of one or more than one object may be changed.

20 Claims, 9 Drawing Sheets

RULE1

| CONDITION PART | WIDTH OF DISPLAYABLE < WIDTH OF PRESENT ALIGNMENT AREA IN TERMINAL   OF OBJECTS |
|---|---|
| CHANGE PROCESS 1 | IF PARTIAL AREA WITH OBJECT "X" IS IN LEFT/RIGHT SPLIT ALIGNMENT, CHANGE ALIGNMENT TO TOP/BOTTOM SPLIT ALIGNMENT |
| CHANGE PROCESS 2 | IF WIDTH OF OBJECT "X" IS GREATER THAN ITS HEIGHT, IT IS ROTATED BY 90 DEGREES |
| CHANGE PROCESS 3 | REDUCE WIDTH OF OBJECT "X" |

FIG. 6B

RULE2

| CONDITION PART | HEIGHT OF TERMINAL < HEIGHT OF PRESENT ALIGNMENT DISPLAYABLE AREA   OF OBJECTS |
|---|---|
| CHANGE PROCESS 1 | IF PARTIAL AREA INCLUDING OBJECT "X" IS IN TOP/BOTTOM SPLIT ALIGNMENT, CHANGE ALIGNMENT TO LEFT/RIGHT SPLIT ALIGNMENT |
| CHANGE PROCESS 2 | IF HEIGHT OF OBJECT "X" IS GREATER THAN ITS WIDTH, IT IS ROTATED BY 90 DEGREES |
| CHANGE PROCESS 3 | REDUCE HEIGHT OF OBJECT "X" |

FIG. 7

| CATEGORIES | DEGREES OF IMPORTANCE |
|---|---|
| PARTIAL AREA | 1 |
| TEXT | 2 |
| ADVERTISEMENT OR RELATED INFORMATION | 3 |
| MENU | 4 |
| TITLE OR CREDIT | 5 |

OBJECT ALIGNMENT CONTROLLER AND OBJECT ALIGNMENT CONTROLLING METHOD

BACKGROUND OF THE INVENTION

1. Field of the Invention

The present invention relates to a technique for optimizing an alignment of objects to be displayed on a display device when utilizing computer software.

2. Description of the Related Art

In recent years, software, especially "multimedia content", has been used widely in various terminals, whose display resolutions or display shapes are distinct from one another, since such typical distribution media as a CD-ROM (Compact Disc Read Only Memory) and the Internet has become popular. A lot of multimedia content are in a style wherein a given area size, that is, a screen resolution and a display form, is fixed for displaying the content. Thus, a problematic matter arises in that the convenient use of such software is remarkably spoiled, owing to an insufficient resolution of a display device in the terminal or to a ratio difference in the lengths of the vertical and-the horizontal lines of the display screen.

For example, there are what is called "Wide Televisions" which can display WWW (World Wide Web) homepages on their screens. Since most homepages are designed to be in a lengthwise form, the area on the screen of the wide televisions significantly needs more space to display the page in the longitudinal direction, on the other hand, the sidewise area thereon is left. Thus, the homepages are inefficiently displayed on the wide televisions.

Figure 9:
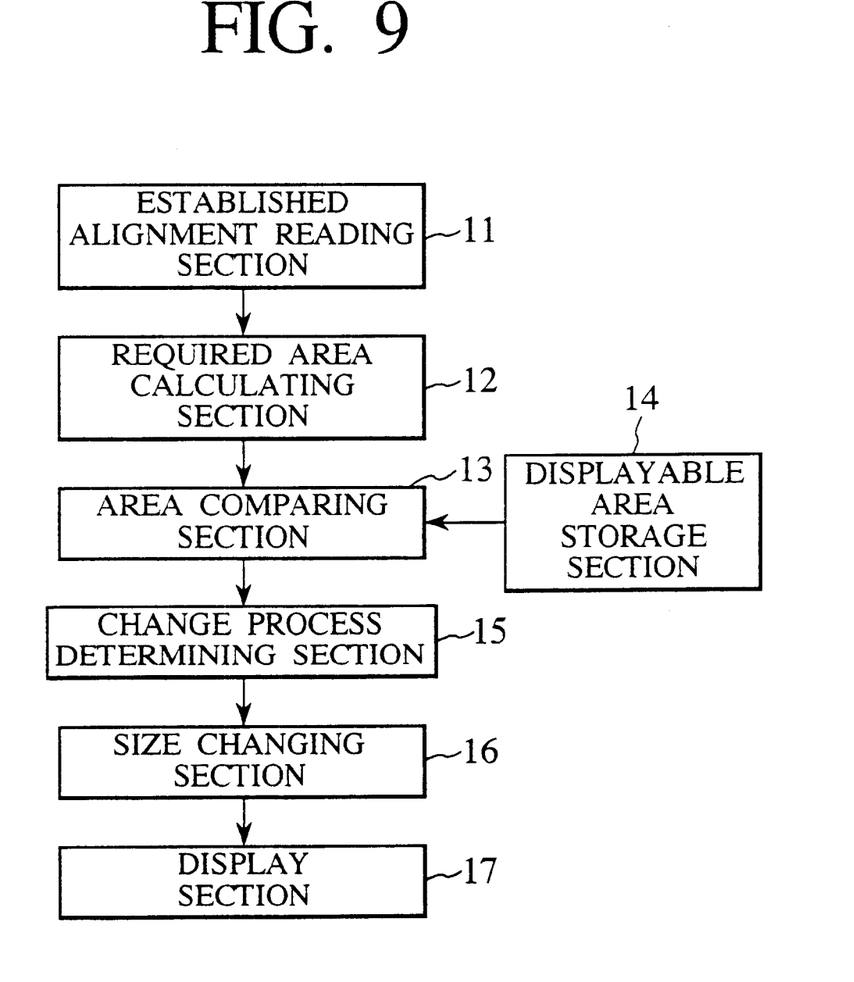
FIG. 9 is a systematic block diagram showing an object alignment controller according to a conventional example.

In order to overcome such a problem, conventionally, there are proposed techniques for simply reducing the content's size of the homepages and for deleting some parts of the pages which may not be displayed on the screen, by using an object alignment controller shown in FIG. 9.

In the device shown in FIG. 9, an established alignment reading section 11 reads out information regarding an established alignment of one or more than one object contained in multimedia content, whereas a required area calculating section 12 calculates a size of an area required for displaying a homepage based on the read alignment information. An area comparing section 13 compares the calculated size of the required area with a size of a displayable area which is stored in a displayable area storage section 14. Now, a change process determining section 15 determines whether to perform a change process for appropriately displaying the objects contained in the content, on the basis of the comparison result. Then, a size changing section 16 enlarges or reduces the size of one or more than one object contained in the content, in accordance with the determination made by the change process determining section 15. The resultant size changed by the size changing section 16 is supplied to a display section 17, so that the content which has been changed in its size is displayed on the display device.

For example, Power Zaurus (trade mark: manufactured by Sharp Corporation) is equipped with a flame split feature to permit users to select a desired area referring from a plurality of areas contained in a homepage so as to display one area at a time on its screen, so that it displays the homepage in a very small scale and on the screen having a low resolution.

In Unexamined Japanese Patent Application KOKAI Publication No. H6-332656, a method for aligning a plurality of graphic objects on a single screen is disclosed. However, the technique shown in Unexamined Japanese Patent Application KOKAI Publication No. H6-332656 has been proposed on the assumption that the plurality of objects are distinct from one another, and is not to provide means for revising an alignment of the objects which is previously determined by a certain producer, etc.

In Unexamined Japanese Patent Application KOKAI Publication No. S63-118830, a method for revising an alignment of objects, which is preset on a screen, according to a screen data form of each terminal device is disclosed. However, in Unexamined Japanese Patent Application KOKAI Publication No. S63-118830, there is not at all mentioned specific means how to change an established alignment of the objects in a manner corresponding to a screen data form of each terminal device.

In International Publication No.WO94/27278, there is disclosed a window system for changing a size of an area having objects according as a position of a window is changed. According to the technique disclosed in International Publication NO. WO94/27278, the objects can be transferred without depending on a resolution of the Window and re-displaying them. However, in International Publication No. WO94/27278, means for optimizing an alignment of the plurality of objects and the size thereof is not disclosed.

In International Publication No. WO95/25299, a technique for performing a display in a manner corresponding to a change in a display environment is disclosed. In the technique disclosed in International Publication No. WO95/25299, a software program, such as an operating system, and an application program, etc., is informed of the change in the display environment, so that display content of software may be conformed with the change in the display environment. In such a case, the software itself makes the display content of the software conform with the change in the display environment. In other words, the technique disclosed in International Publication No. WO95/25299 is not to provide means for specifically optimizing the alignment of the plurality of objects or the size thereof.

In Unexamined Japanese Patent Application KOKAI Publication No. H10-133973, a technique for displaying information in the form of HTML (Hyper Text Markup Language) on various terminals each having a distinct resolution and a screen size is disclosed. According to the technique disclosed in Unexamined Japanese Patent Application KOKAI Publication No. H10-133973, each terminal sends information regarding an operable screen size in response to a request command from a center computer which provides information, and the center computer sets the screen size of each terminal for providing the information data corresponding to the set screen size to the terminal. In this case as well, the alignment of a plurality of objects and the size thereof are set in accordance with the prepared information data, thus the above-described technique does not intend to provide means for optimizing the alignment of the objects.

As described above, there has not conventionally been proposed any technique for providing specific means for changing the alignment of the objects in order to conform the form of the screen. Thus, according to the conventional techniques, various display devices can not efficiently be utilized, because such devices display on the screen computer software including a plurality of objects whose alignment is previously established or which are simply enlarged/reduced in their size.

In addition, the conventional techniques have not been developed under the consideration that the relationship between the objects is to preferably be maintained and that the software is to apparently be displayed. On the other hand, in multimedia content which is produced as a piece of work rather than simple information content, a plurality of objects are generally aligned on the basis of correlation between the objects contained therein and of functions of the objects. Accordingly, there is a fearful possibility that the objects may not remarkably be in a desired mutual relationship, if the alignment of the objects contained in the computer software is simply changed.

SUMMARY OF THE INVENTION

An object of the present invention is to provide an object alignment controller, an object alignment controlling method, a recording medium, and a program data signal, all being capable of efficiently using a display area, when computer software, such as multimedia content, etc., having a plurality of objects is displayed in the display area on a display device.

In order to achieve the above-described object, according to the first aspect of the present invention, there is provided an object alignment controller for controlling an alignment of a plurality of objects contained in computer software and for displaying the objects on a display device, the controller comprising:

a memory which stores
        computer software containing the objects an alignment of which is to be controlled,
        a structure of the objects contained in the computer software,
        a size of a displayable area for displaying the objects contained in the computer software on the display device, and
        a predetermined program; and
    a processor for, by executing the predetermined program stored in the memory,
        analyzing a structure of the objects contained in the computer software and storing the analyzed structure in the memory,
        calculating a size of an area which is required for displaying the objects contained in the computer software in the structure stored in the memory,
        comparing the calculated size of the required area with the size of the displayable area which is stored in the memory,
        determining whether to change the structure of the objects on the basis of the comparison result of the area sizes,
        changing the retained structure of the objects, when determined to change the structure of the objects, and
        storing the changed structure of the objects as a new structure of the objects in the memory.

According to the above-described object alignment controller, if the objects contained in the computer software can not be displayed in the displayable area, the structure of the objects is changed, so that the objects can be displayed in the displayable area based on the newly-changed structure. Thus, the displayable area (possibly the entire display device) set on the display device may efficiently be used.

In the above-described object alignment controller, the processor may allow the objects contained in the computer software to be displayed in the displayable area on the display device in accordance with the structure stored in the memory, when determined not to change the structure of the objects.

In the above-described object alignment controller, the processor may repeat the determining the changing, until a comparison result that the calculated size of the required area is within the size of the displayable area is obtained, or all applicable changes are made in the structure.

In the above-described object alignment controller, the processor may analyze an established alignment of the objects contained in the computer software and may represent the structure of the objects as an analyzed result in a tree structure. In this case, the memory may store the structure of the objects which is represented in the tree structure.

In the above-described object alignment controller, the processor may change the structure of the objects which is stored in the memory by changing a size of one or more than one object in the structure.

In the above-described object alignment controller, the processor may change the structure of the objects which is stored in the memory by changing an alignment of the objects in the structure.

In order to achieve the above-described object, according to the second aspect of the present invention, there is provided an object alignment controller for controlling an alignment of a plurality of objects contained in computer software and for displaying the objects on a display device, the controller comprising:

area storing means for storing a size of a displayable area for displaying the objects contained in the computer software;
    structure analyzing means for analyzing a structure of the objects contained in the computer software;
    structure retaining means for retaining the structure of the objects which is analyzed by the structure analyzing means;
    required area calculating means for calculating a size of an area which is required for displaying the objects contained in the computer software in the structure retained by the structure retaining means;
    area comparing means for comparing the size of the required area which is calculated by the required area calculating means with the size of the displayable area which the area storing means stores;
    structure change determining means for determining whether to change the structure of the objects on the basis of the comparison result processed by the area comparing means; and
    structure changing means for changing, when the structure change determining means determines to change the structure of the objects, the structure of the objects which is retained in the structure retaining means, and for allowing the structure retaining means to retain the changed structure of the objects as a new structure of the objects.

In the object alignment controller according to the second aspect of the present invention, the structure change determining means may determine whether the structure change determining means is to change the structure of the objects, until a calculation result that the size of the required area which is calculated by the area calculation means is within the size of the displayable area is obtained, or all applicable changes are made in the structure.

In order to achieve the above-described object, according to the third aspect of the present invention, there is provided an object controlling method for controlling an alignment of a plurality of objects contained in computer software and for displaying the objects on a display device, the method comprising:

storing a size of an area for displaying the objects contained in the computer software on the display device;

analyzing a structure of the objects contained in the computer software;

retaining the analyzed structure of the objects;

calculating a size of an area required for displaying the objects contained in the computer software in the retained structure;

comparing the calculated size of the required area with the stored size of the displayable area;

determining whether to change the structure of the objects on the basis of the comparison result of the area sizes; and changing the retained structure of the objects when determined to change the structure of the objects, and storing the changed structure as a new structure of the objects.

According to the above-described object alignment controlling method, if the objects contained in the computer software can not be displayed in the displayable area, the structure of the objects may be changed for displaying the objects in the displayable area on the basis of the newly-changed structure. Thus, the displayable area (possibly the entire display device) set on the display device can efficiently be utilized.

The above-described object alignment controlling method may further include displaying the objects contained in the computer software in the displayable area on the display device in accordance with the retained structure, when determined not to change the structure of the objects.

In the above-described object alignment controlling method, the determining and changing may repeat, until a comparison result that the size of the required area calculated by said area comparing means is within the size of the displayable area is obtained, or all applicable changes are made in the structure.

In the above-described object alignment controlling method, the analyzing may analyze an established alignment of the objects contained in the computer software, and represent the structure of the objects as the analyzed result represented in a tree structural, and the retaining retains the structure of the objects which is represented as the analyzed result in the tree structure.

In this case, the change in the structure of the objects may be done by performing either one of process, such as insertion, deletion of a partial tree in a tree structure representing the structure, and re-connection of a node in the tree structure.

The above-described alignment controlling method may include changing the retained structure of the objects by changing a size of one or more objects contained in corresponding software.

The above-described alignment controlling method may include changing the retained structure of the objects by changing the alignment of the objects contained in corresponding software.

In this case, changing the alignment of the objects may include rotating one or more objects which are contained in corresponding software.

In order to achieve the above-described object, according to the fourth aspect of the present invention, there is provided a computer readable recording medium which stores a program for controlling an alignment of a plurality of objects contained in computer software and for displaying the objects on a display device, the recording medium for recording the program which makes a computer function as:

area storing means for storing a size of an area for displaying objects contained in the computer software on the display device;

structure analyzing means for analyzing a structure of the objects contained in the computer software;

structure retaining means for retaining the structure of the objects which is analyzed by the structure analyzing means;

required area calculating means for calculating a size of an area required for displaying the objects contained in the computer software in the structure retained in the structure retaining means;

area comparing means for comparing the size of the required area which is calculated by the required area calculating means with the size of the displayable area which the area storing means stores;

structure change determining means for determining whether to change the structure of the objects on the basis of the resultant comparison processed by the area comparing means; and structure changing means for changing the structure of the objects retained by the retaining means when the structure changing means determines to change the structure of the objects, and for storing the changed structure as a new structure of the objects.

In the above-described computer readable recording medium, the structure change determining means may determine whether the structure of the objects is to be changed by the structure change determining means, until a comparison result that the size of the required area calculated by the area comparing means is within the size of the displayable area is obtained, or all applicable changes are made in the structure.

In order to achieve the above-described object, according to the fifth aspect of the present invention, there is provided a program data signal embodied in a carrier wave, for controlling an alignment of a plurality of objects contained in computer software and for displaying the controlled alignment of the objects on a display device, the program data signal comprising a segment for realizing:

an area storing function for storing a size of an area for displaying objects contained in the computer software on the display device;

a structure analyzing function for analyzing a structure of the objects contained in the computer software;

a structure retaining function for retaining the structure of the objects which is analyzed by the structure analyzing function;

a required area calculating function for calculating a size of an area required for displaying the objects contained in the computer software in the structure retained by the structure retaining function;

an area comparing function for comparing the size of the required area which is calculated by the required area calculating function with the size of the displayable area which the area storing function stores;

a structure change determination function for determining whether to change the structure of the objects, on the basis of the comparison result performed by the area comparing function;

a structure change function for changing, when the structure change determination function determines to change the structure of the objects, the structure of the objects which is retained by the retaining function, and for retaining the changed structure as a new structure of the objects.

In the above-described program data signal, the structure change determination function may determine whether the structure of the objects is to be changed by the structure change determination function, until the size of the required area which is calculated by the area comparing function is within a size of the displayable area, or all applicable changes are made in the structure.

Other advantages and meritorious features of the present invention will become more fully understood from the preferred embodiments, the claims, the drawings, and the brief description of which follows.

DETAILED DESCRIPTION OF THE PREFERRED EMBODIMENT

A preferred embodiment of the present invention will now be described with reference to the accompanying drawings.

Figure 1:
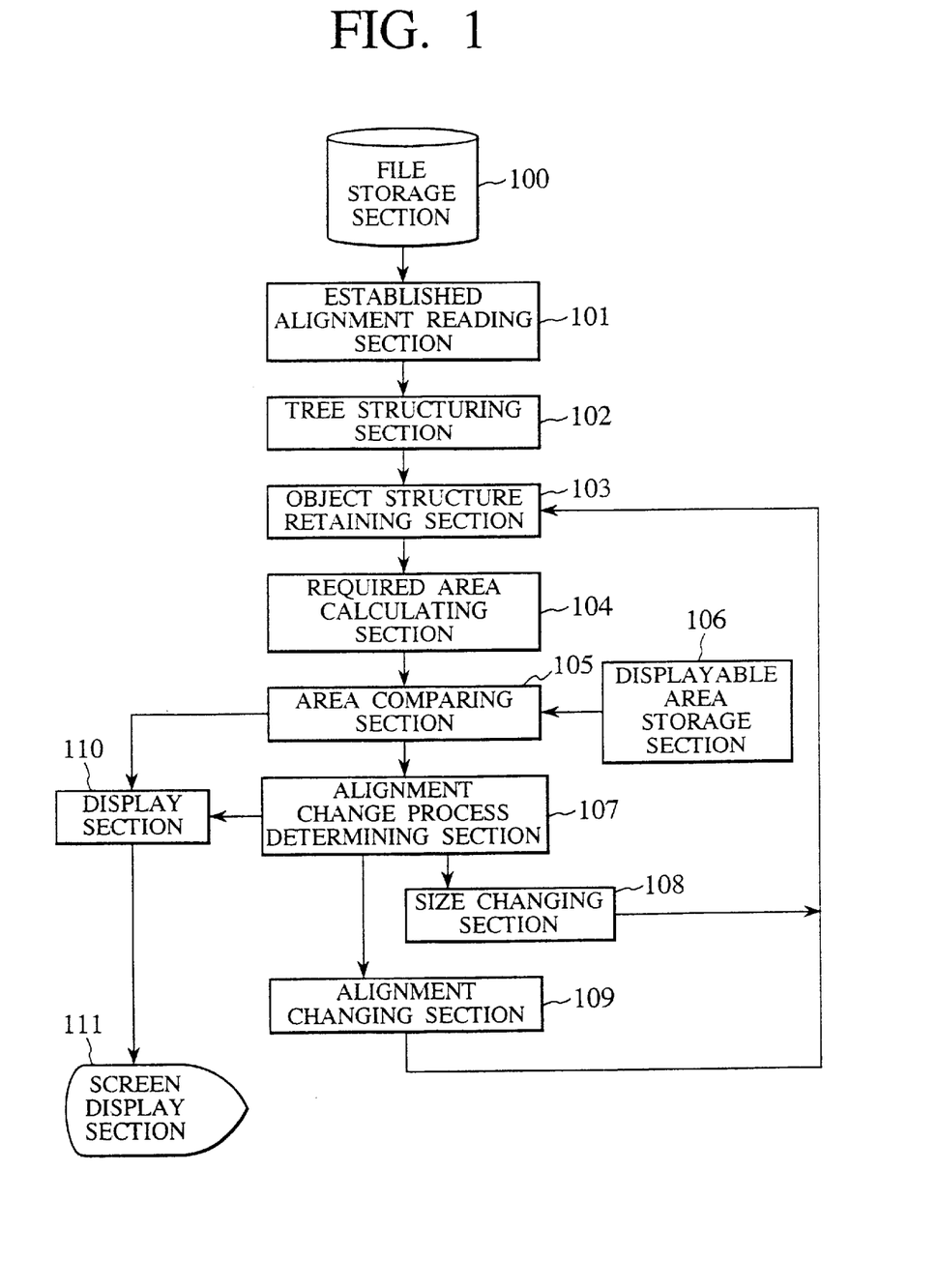
FIG. 1 is a systematic block diagram showing a display system employing an object alignment controller according to an embodiment of the present invention.

FIG. 1 illustrates a systematic structure of a display system which includes an object alignment controller according to an embodiment of the present invention. Each element for forming multimedia content which is output on a screen will hereinafter be referred to as an object. It should be noted, however, that the display system of the present invention can be realized not only for outputting the multimedia content thereon, but also for other various types of computer software as well.

The display system shown in FIG. 1 includes various functions such as a file storage section 100, an established alignment reading section 101, a tree structuring section 102, an object structure retaining section 103, a required area calculating section 104, an area comparing section 105, a displayable area storage section 106, an alignment change process determining section 107, a size changing section 108, an alignment changing section 109, a display section 110 and a screen display section 111.

Figure 2:
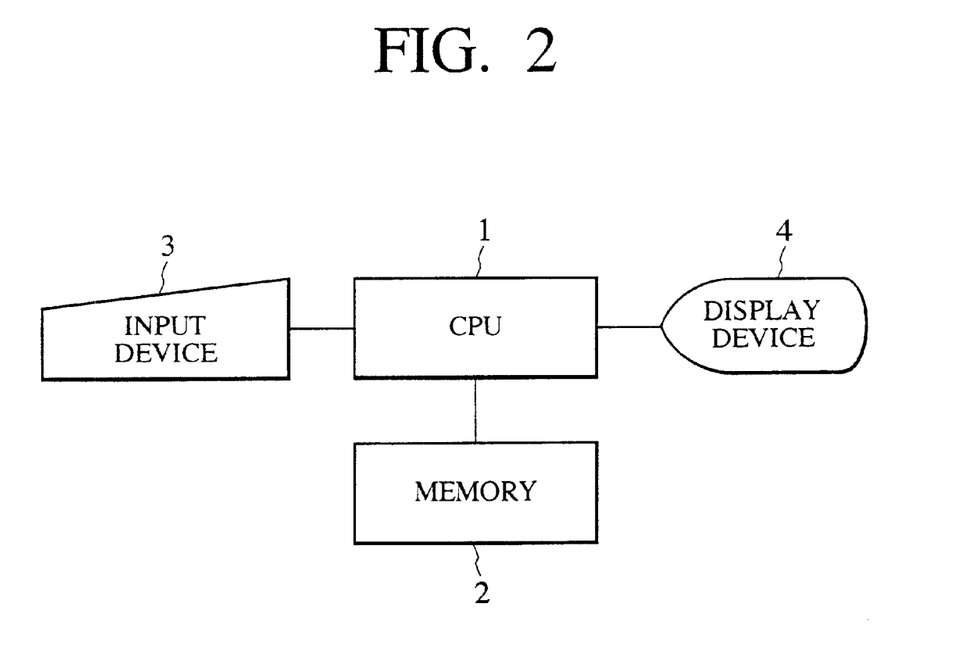
FIG. 2 is a diagram exemplifying a computer system for realizing the display system shown in FIG. 1.

The display system of this embodiment may be realized on a computer system shown in FIG. 2, for example. The computer system illustrated in FIG. 2 comprises a CPU (Central Processing Unit) 1, a memory 2, an input device 3, and a display device 4.

The CPU 1 realizes each function of the above-described display system by executing a predetermined program which is stored in the memory 2. The memory 2 comprises a main memory unit and a secondary memory unit. The memory 2 retains a predetermined area, thereby realizing such functions of the file storage section 100, the object structure retaining section 103, and the displayable area storage section 106.

A user uses the input device 3 for selecting to-be-displayed content with reference to the multimedia content which is stored in the file storage section 100 or for inputting data which the displayable area storage section 106 stores. The input device 3 may also be used for inputting the multimedia content to be stored in the file storage section 100. The display device 4 realizes the function of the display section 110, by being in cooperation with the CPU 1 which is operated under the control of a program, and provides the function of the screen display section 111 as well. That is, a size and a resolution of the screen section 111 are determined by the display device 4.

In the display system having the above-described systematic structure as shown in FIG. 1, a series of operations, from a process for selecting predetermined content from the multimedia content stored in the file storage section 100 until a process for changing the alignment of the objects contained in the selected content for displaying the aligned objects on the screen display section 111, will now be explained.

The user operates the input device 3 to select desired multimedia content with reference to the multimedia content stored in the file storage section 100. The established alignment reading section 101 reads out alignment definition information regarding objects contained in the multimedia content which is stored in the file storage section 100 in a manner corresponding to the selected multimedia content.

The tree structuring section 102 converts the read alignment definition information regarding the objects into a representation of a tree structure. That is, in a case where the multimedia content includes, for example, a menu area 201, a title area 202, a text area 203, and an advertisement area 204 as shown in FIG. 3A, the tree structuring section 102 converts the alignment definition information into a representation of a tree structure illustrated in FIG. 4A.

Figure 3A:
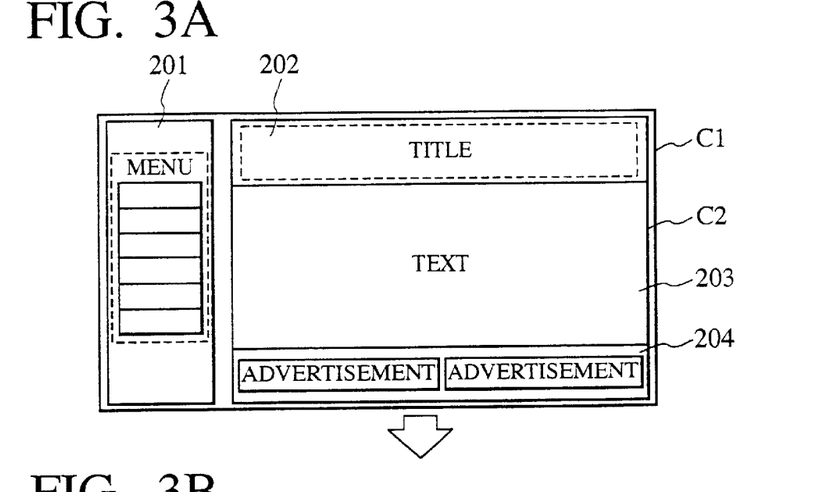
FIGS. 3A to 3C are diagrams each showing an alignment of objects on a display screen in the display system of FIG. 1.

A label C1 in FIG. 3A indicates a compound area entirely including the menu area 201, the title area 202, the text area 203, and the advertisement area 204. A label R1 indicates a compound area including the title area 202, the text area 203, and the advertisement area 204. That is, the label C1 indicates the compound area wherein the menu area 201 and the compound area indicated by the label R1 are included.

Figure 4A:
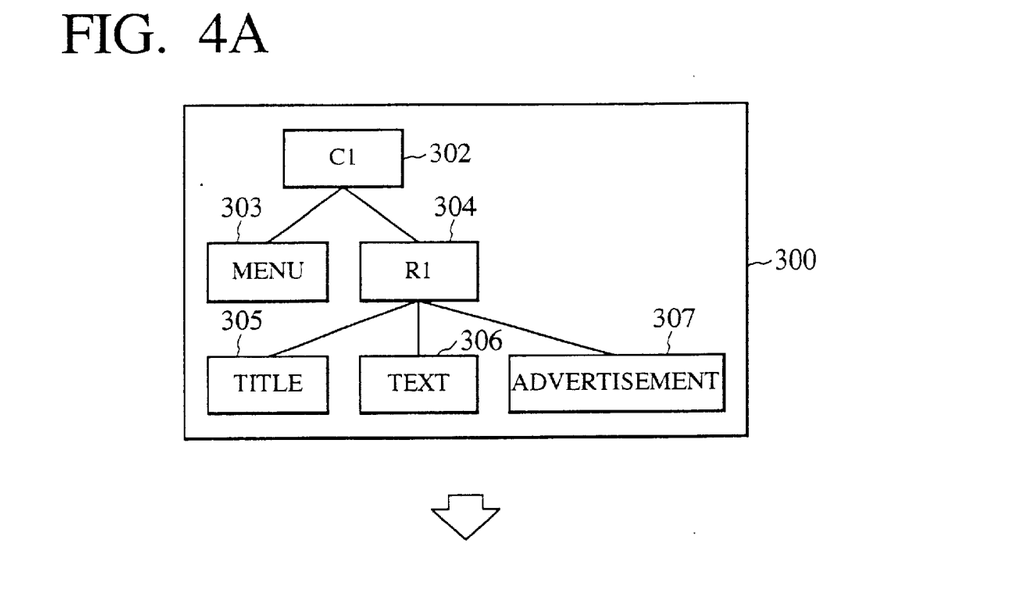
FIGS. 4A and 4B are diagrams each showing a tree structural for representing and classifying the alignment of the objects.

The areas 201 to 204 for displaying the objects contained in the content shown in FIG. 3A, as well as the compound areas C1 and the R1 are each represented as any one of corresponding nodes 302 to 307 in the tree structure, as illustrated in FIG. 4A. Each area name is recorded in the nodes 303, 305, 306, and 307, respectively corresponding to the menu area 201, the title area 202, the text area 203, and the advertisement area 204.

Names of child nodes and the name of the label C1 or R1 are stored in the nodes 302 and 304 (hereinafter referred to each as a "area split node") corresponding to the compound areas which the labels C1 and R1 indicate. The area split node 302 stores values representing widths of two areas wherein the area indicated by the corresponding label C1 is split into two parts, that is, width values of the menu area 201 and of the compound area indicated by the compound area (label) R1. The area split node 304 stores values representing heights of three areas wherein the area indicated by the corresponding label R1 is split into three parts, that is, height values of the title area 202, text area 203 and of the advertisement area 204.

Figure 5A:
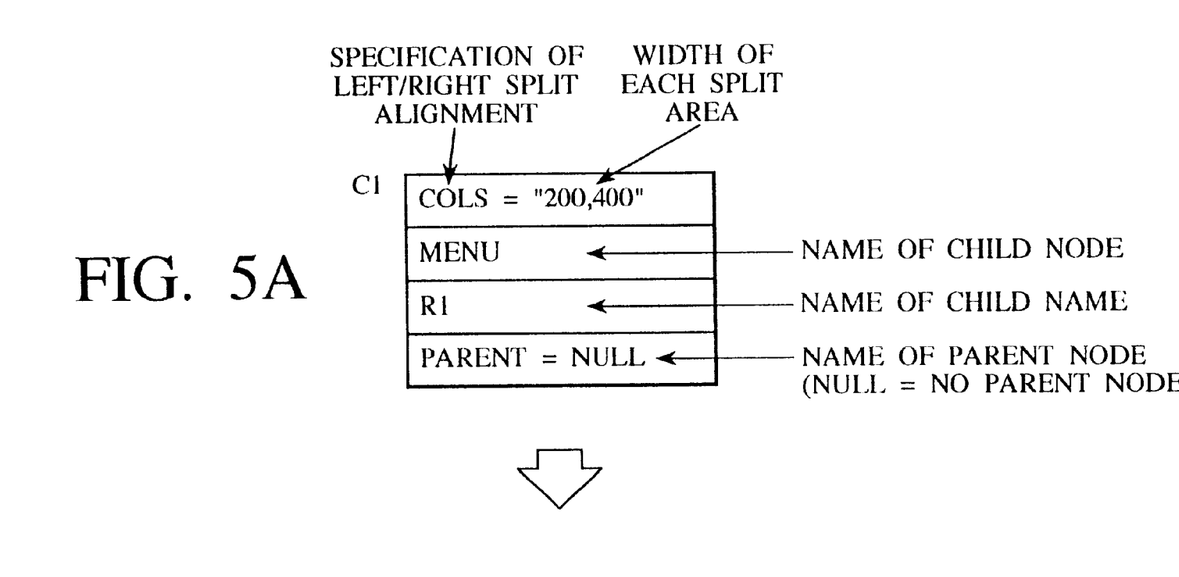
FIGS. 5A and 5B are diagrams each showing a condition of a single object which is retained by an object retaining section shown in FIG. 1.

For example, the area split node 302 represented as the label C1 may store, in a list form, information regarding specification of a left/right split alignment, widths of each split area, names of the child nodes, and a name of a parent node, as shown in FIG. 5A.

Accordingly, the tree structuring section 102 analyzes the alignment definition information, so that the information represented in the form of the tree structure is retained in object structure retaining section 103. It should be noted that the labels C1 and R1 in this embodiment represent a split in a left/right split alignment, (C is the initial letter of "COLUMN") and a split in a top/bottom alignment, (R is the initial letter of "ROW"), respectively. A label C2, which will be explained later, represents a split in a left/right split alignment, likewise the label C1.

It should be noted that the left/right split alignment means to align an object group, including one or more than one object, in a horizontal direction for displaying the object group on the screen display section 111, regardless of the number of the to-be-aligned object groups. On the other hand, the top/bottom split alignment means to align an object group, including one or more than on object, in a vertical direction for displaying the object group on the screen display section 111, regardless of the number of the to-be-aligned object groups.

The required area calculating section 104 calculates a size of an area required for displaying the entire objects contained in the selected content, on the basis of height and width values of the respective partial areas stored in the nodes 302 and 304. The area comparing section 105 compares the calculated size of the required area with a size of the screen display section 111, which is pre-stored in the displayable area storage section 106, that is, a size of the displayable area. The size value of the displayable area which area is stored in the displayable area storage section 106 means a value representing a resolution of the entire display device 4 (screen display section 111) which is represented in a pixel number (dot) in relation to its height and width respectively. The size value may be set by the user inputting from the input device 3, for example.

In a case where the area comparing section 105 obtains a comparison result that either value of the height and the width of the required area is greater than that of the displayable area, it informs the alignment change process determining section 107 that the size of the area is not large enough. On the contrary, if the area comparing section 105 obtains a comparison result that both values of the height and the width of the required area is within a range of those of the displayable area, it sends information regarding the objects contained in the content and regarding the alignment retained in the object structure retaining section 103 to the display section 110. The display section 110 then displays the multimedia content on the screen display section 111 in accordance with the sent information regarding the objects and their alignment.

When the alignment change process determining section 107 is informed that the size of the required area is not large enough, it determines to change the alignment of the objects contained in the content. If the alignment change process determining section 107 determines to change the alignment of the objects, it allows, for example, the size changing section 108 to make the size of the objects smaller in accordance with a method, will be described later, and it also allows the alignment changing section 109 to change the alignment of the objects. A technique represented in unexamined Japanese Patent Application KOKAI publication No. 11-66101 etc., is available as a technique for realizing a size change in the objects by means of the size changing section 108.

Figure 3B:
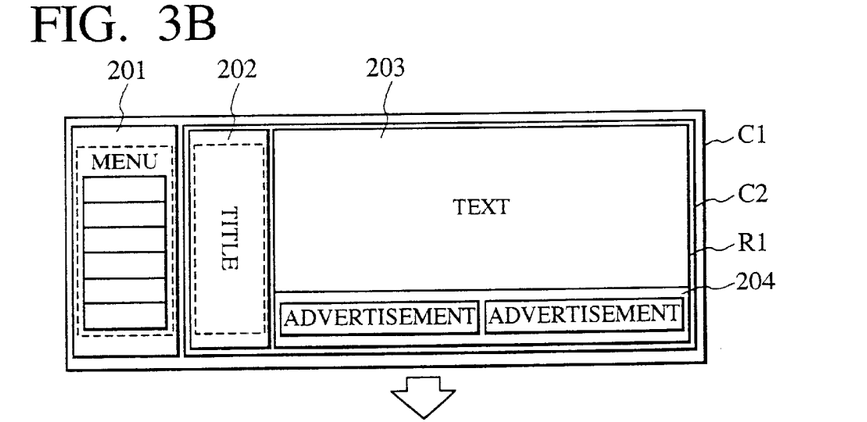

The alignment changing section 109 changes the alignment of the objects in the content by changing the information which is represented in the tree structure and is retained in the object structure retaining section 103. For example, if a height of the screen display 111 is smaller than a height of the established alignment of the objects in the content, the alignment changing section 109 changes a tree structure shown in FIG. 4A to a tree structure 301 shown in FIG. 4B. In such a case, the alignment of the areas 201 to 204 shown in FIG. 3A is changed to that shown in FIG. 3B or 3C. In addition to this, the object as the title area 202 may be rotated as shown in FIG. 3B or may stay in its direction as is, as shown in FIG. 3B. An alignment change process executed by the alignment changing section 109 may be performed by applying any one of the following methods (1) to (4):

(1) a method for determining an alignment change in accordance with a difference between calculated height and width values of the required area, and height and width values of an area of the screen display section 111 which is stored in the displayable area storage section 106;

(2) a method for changing a top/bottom alignment between adjacent objects aligned horizontally to a left/right split alignment, and changing a left/right split alignment in relation to a vertical axis to a top/bottom alignment in relation to a horizontal axis;

(3) a method for rotating one or more than one object, and aligning objects which are top/bottom aligned to a left/right split alignment, and aligning objects which are left/right aligned to a top/bottom alignment; and (4) a method for applying the above-described methods (1) to (3), simultaneously with reduction of one or more than one object, which has been reduced in its size by the size changing section 108.

Information indicating whether each of the objects contained in the multimedia content can be rotated may be pre-added to the objects. The alignment changing section 109 may rotate only objects with information indicating that the object is to be rotated, and may allow the objects with such information to be displayed on the screen display section 111.

Figure 6A:
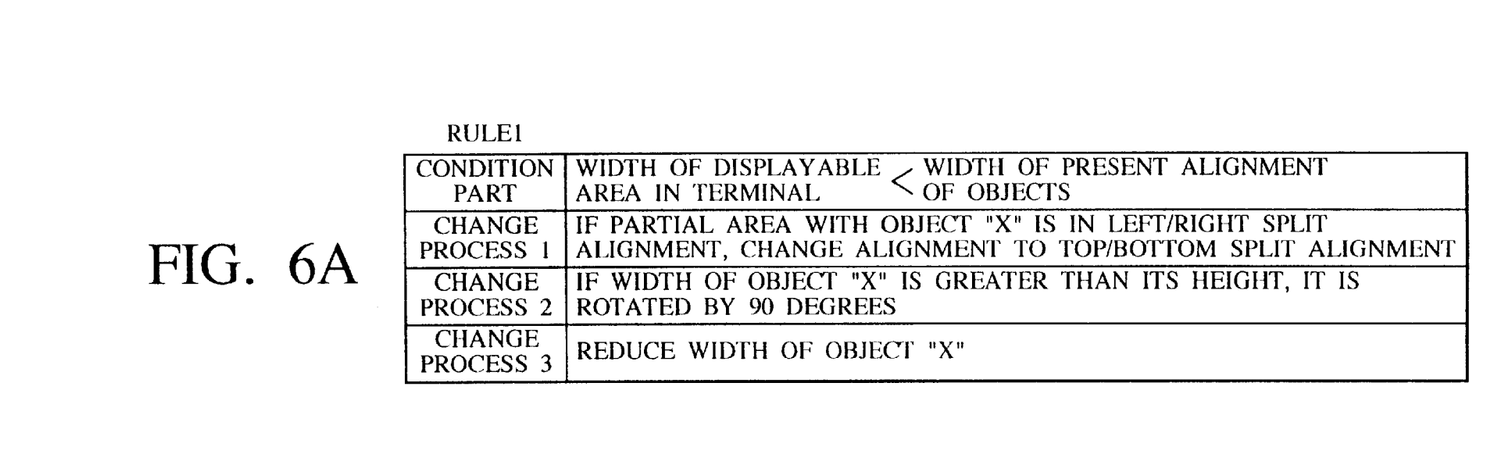
FIGS. 6A and 6B are diagrams each exemplifying a rule prepared in an alignment change process determining section shown in FIG. 1.
Figure 6B:
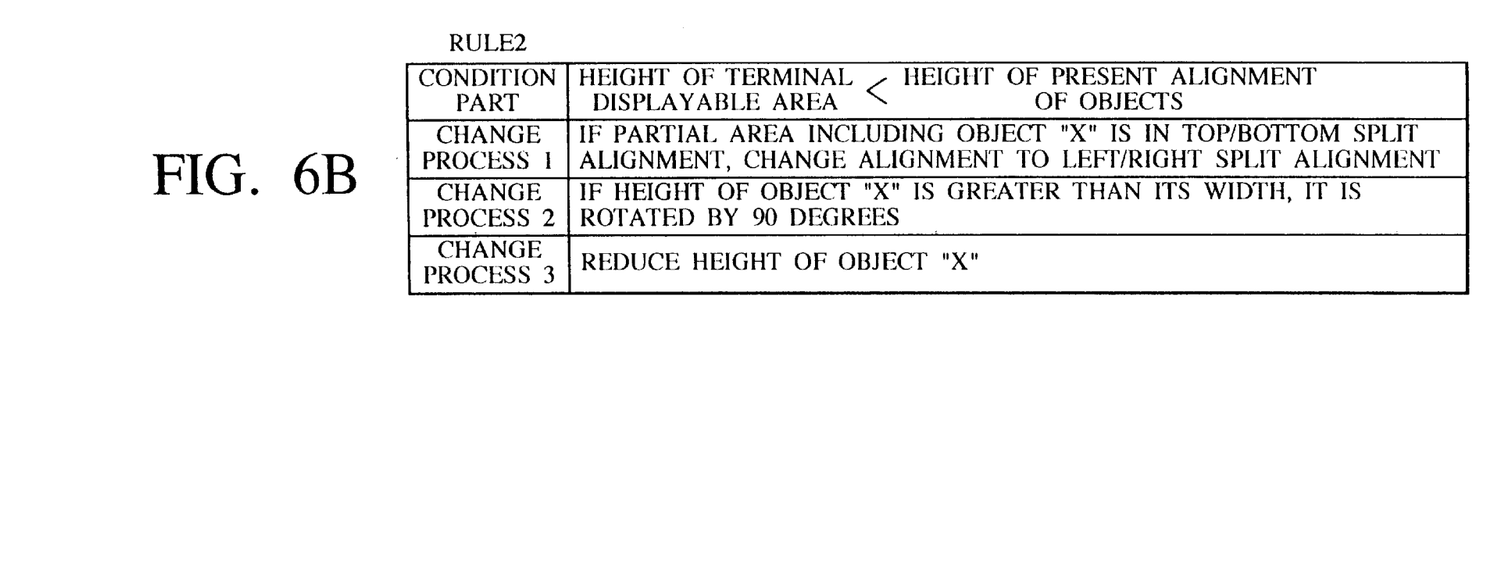

Rules shown in FIGS. 6A and 6B, for example, may be prepared in the alignment change process determining section 107 for selecting the alignment change process. There may be employed a method for selecting a rule which satisfies an inequality of a condition part, in accordance with a comparison result calculated by the area comparing section 105, and applying more than one change process defined to the selected rule to the respective objects, in sequential order from the first one of the objects. A description "object X" in FIGS. 6A and 6B means an object for which an object name contained in the content substitutes.

Figure 7:
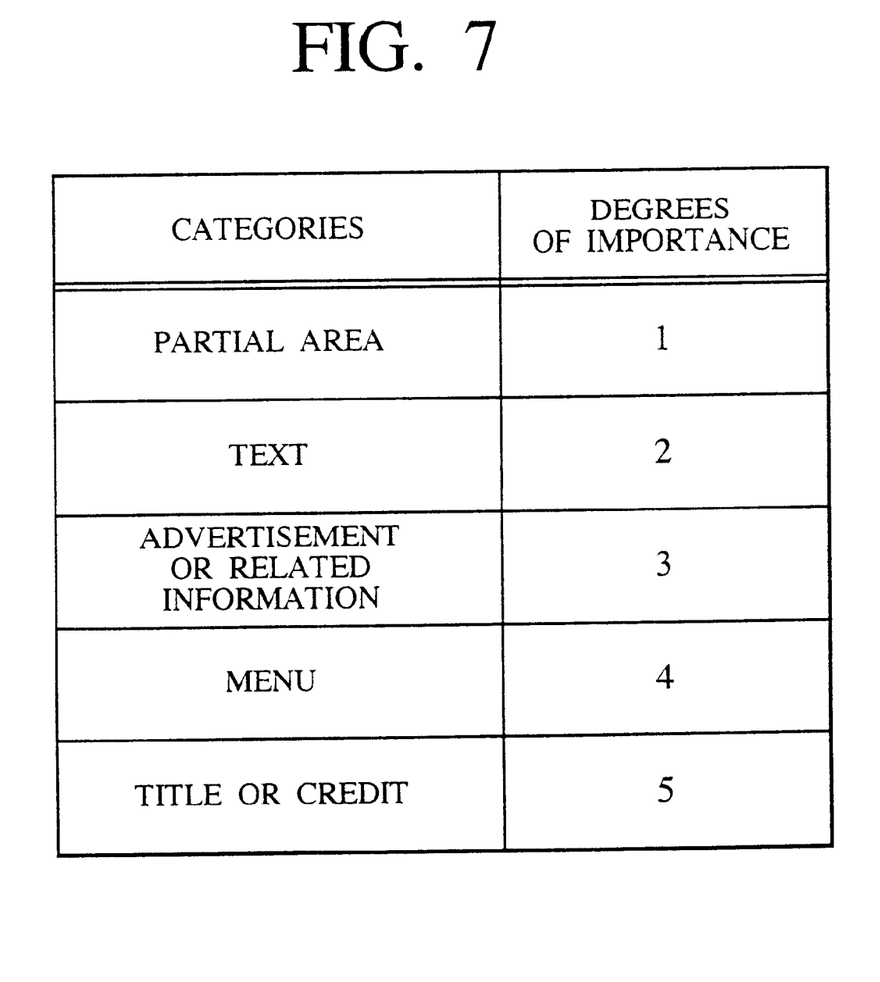
FIG. 7 is a diagram exemplifying categories of objects and degrees of importance depending on each category which are shown in FIG. 6A.

If the respective objects may be categorized in a limited number of categories or if any one of known category names is described in each object, the alignment change process determining section 107 may sequentially apply the change process to the objects, from an object which belongs to the least important rank (or a value of a degree of importance is high as described in FIG. 7), through utilization of a table indicating the categories of the objects and the degree of importance, shown in FIG. 7.

Further, the alignment change process determining section 107 may define the rules of the change process shown in FIGS. 6A and 6B in a manner corresponding to each category. For example, if the category of the object is "title" or "credit", the object is made to be smaller before being rotated, and if the category of the object is "advertisement", a reduction process should not be applied to the object. In other words, the alignment of the objects can be controlled more precisely.

Figure 3C:
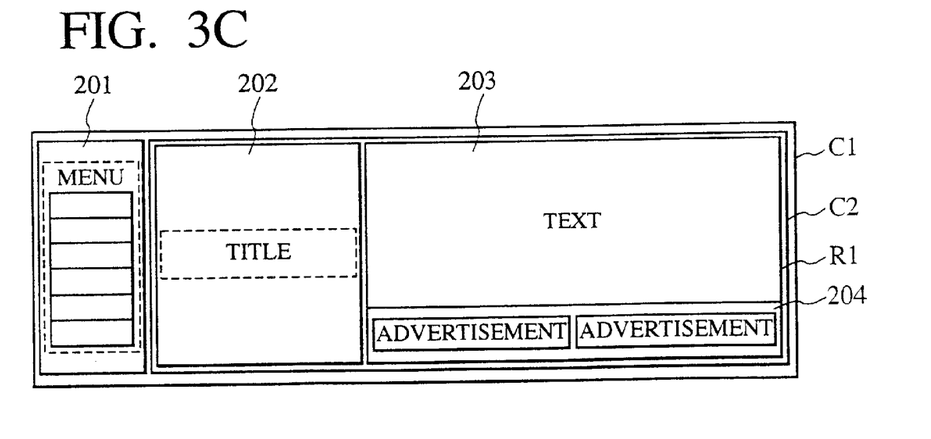
Figure 4B:
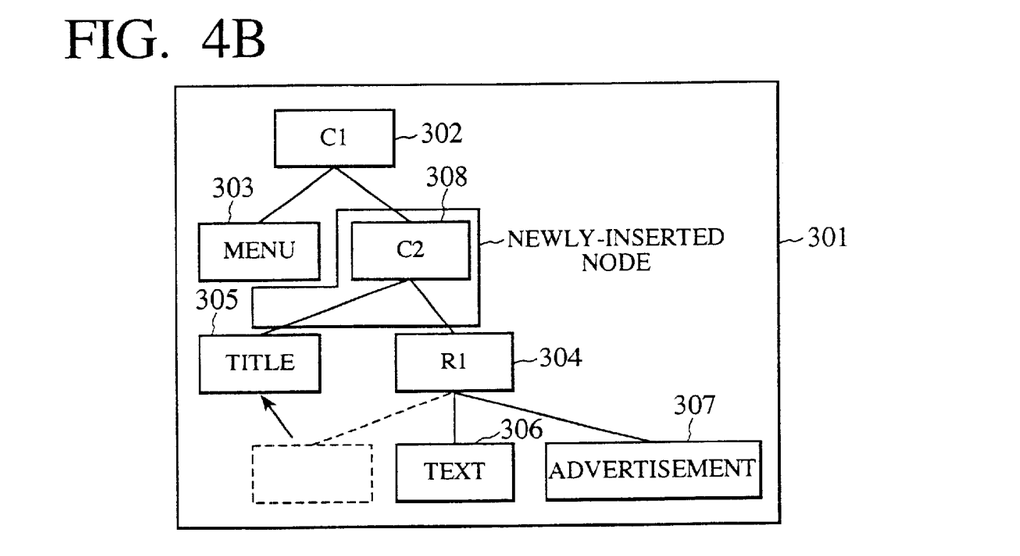
Figure 5B:
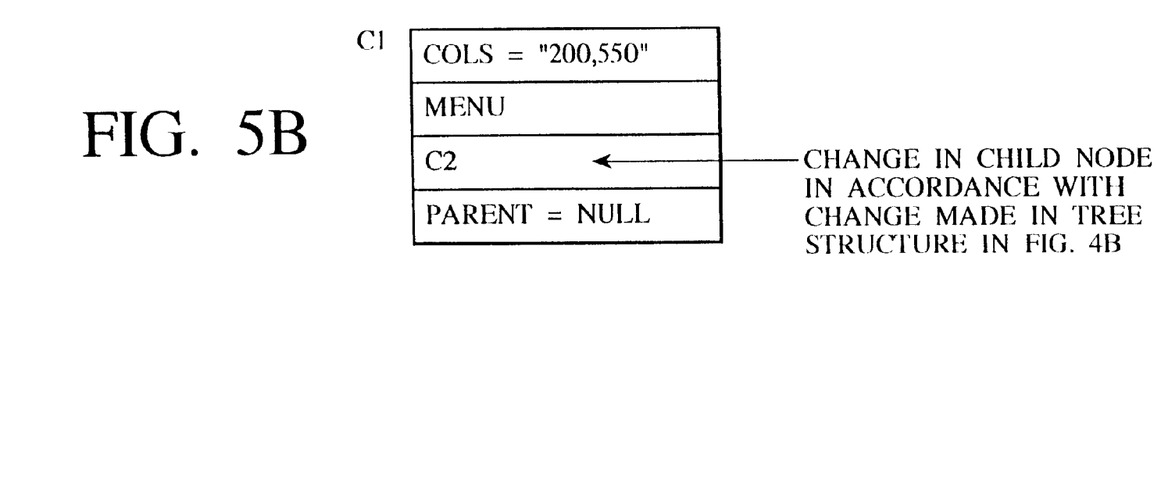

FIGS. 3B and 3C each illustrates an example of a result in which the objects are re-aligned based on a tree structure 301 shown in FIG. 4B. An area split node 308 which is newly inserted in the tree structure corresponds to a compound area which is indicated by a label C2 in FIGS. 3B and 3C. In such a case, the information regarding the specification of the left/right split alignment, widths of each split area, names of the child nodes, and a name of a parent node stored in the node 302, as the label C1, as shown in FIG. 5A, is updated as illustrated in FIG. 5B.

The newly-inserted area split node 308 has the node 305 corresponding to the to-be-realigned title area 202 and the node 304 as the label R1 which is originally the parent node of the node 305, each as a child node. Accordingly, the areas of the objects may be preferably retained on the screen. For example, the menu area 201 is aligned on the left side of the area indicated as the label C1. As shown in FIGS. 3B and 3C, in the area indicated as label R1, the text area 203 and the advertisement area 204 are preferably aligned in the top/bottom alignment, wherein the text area 203 is aligned above the advertisement area 204, almost simultaneously with the alignment change.

Furthermore, the title area 202 is aligned above the text area 203 and the advertisement area 204, as shown in FIG. 3A, however, after a change in it alignment, it will be aligned on the left of the text area 203 and the advertisement area 204, as shown in FIGS. 3B and 3C. In this case, the alignment change process determining section 107 may define a rule that an object which is aligned relatively in an upper level in the original alignment may be re-aligned in the left side, and that an object which is aligned relatively in a lower level in the original alignment may be re-aligned in the right side.

In general, when a person refers a document of the lateral writing, his/her eyes are supposed to be moving in the direction from the right to the left and from the top to the bottom. Thus, in defining the above-described rule by means of the alignment change process determining section 107, an object appearing at first on the screen may even appear at first to be displayed on the screen display section 111 after the alignment of the objects is changed. When the objects contained in the content displayed on the same screen are aligned in consideration of such an order relation, it can be expected that the objects are effectively aligned with such a relationship even after the alignment change process has been performed.

The alignment changing section 109 performs the information change in the tree structural representation to a single node (object) at once. The resultant node is reflected in the information in the representation of the tree structural which is retained in the object structure retaining section 103. The required area calculating section 104 calculates height and width values of the required area in a state where the objects are re-aligned, on the basis of the change information in the representation of the tree structure. The area comparing section 105 compares the calculated values with the area size (displayable area) of the screen display section 111 which is stored in the displayable area storage section 106. If the required area does not still fit into the range of the displayable area, the alignment change process determining section 107 permits the alignment changing section 109 to perform the alignment change process to a node which is distinct from the node to which the alignment change process has already been performed.

In a case where the alignment changing section 109 performs the alignment change process to all nodes, or the size changing section 108 performs the change process to all objects, or where all executable change processes are performed, the alignment change process determining section 107 sends the objects contained in the content and the information regarding the alignment retained in the object structure retaining section 103 to the display section 110 for allowing the content displayed on the screen display section 111.

In such a case, the display section 110 is not ready to completely adapt the resolution or the form of the screen display section 111. Thus, it is preferred to provide means for permitting the user to view all of the objects contained in the content, by through a step of, for example, displaying the scroll bar beforehand.

If the display section 110 receives the latest information in the representation of the tree structure regarding the objects contained in the content and the their alignment, from the area comparing section 105 or the alignment change process determining section 107, it re-aligns the objects in accordance with the information in the representation of the tree structural for displaying the content on the screen display section 111.

As explained above, in the display system according to this embodiment, when such software as the multimedia content is displayed on the plurality of display devices 4 having various resolutions and shapes, the objects are not only made smaller, but also changed in their alignment to correspond to the insufficiency of the resolution and/or the size of the area, thereby to be displayed on each display device 4 (screen display section 111). Accordingly, the display system according to this embodiment can effectively make use of the area of the display device 4 (screen display section 111).

According to the display system according to the embodiment of the present invention, the to-be-displayed objects contained in the computer software are represented in the tree structure and retained in the object structure retaining section 103. Thus, the alignment changing section 109 can re-align the objects to display the objects on the display device 4 (screen display section 111), while maintaining the relationship between the objects which are intended to be aligned in accordance with the established alignment.

In the above-described embodiment, the entire part of the display device 4 is to correspond to the screen display section 111 and functions as the display area of the computer software including the plurality of objects. The data regarding the display area is input through from the input device 3. However, the present invention is not limited to the above. For example, a window on the display device 4 may be operated as the screen display section 111, so that the size of the window may be obtained from the operating system in accordance with the size of the window which is changed by an input from the input device 3 and that the size of the window may be obtained by the displayable area storage section 106. In other words, the alignment of the objects to be displayed may be changed in a manner corresponding to the size change in the window.

In the above-described embodiment, the display system of the present invention has been explained in a case where the system is realized on the general-purpose computer system, which is shown in FIG. 2. Programs for carrying out the above-described processes are recorded in the memory 2. However, the display system of the present is not limited to the above, and at least one of the functions 100 to 110, shown in FIG. 1, may be executed on a system with dedicated hardware.

Figure 8A:
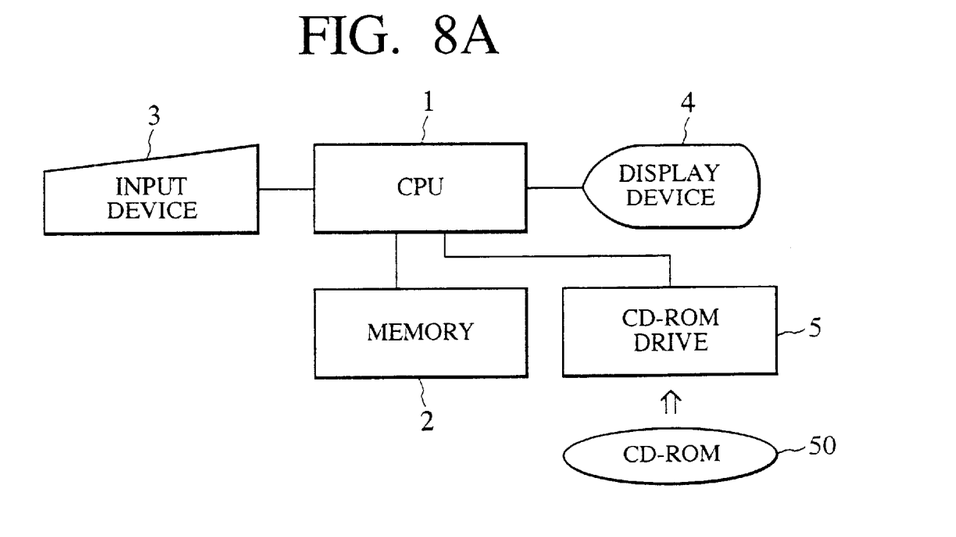
FIGS. 8A and 8B are diagrams exemplifying another computer system for realizing the display system shown in FIG. 1.

The programs recorded in the memory 2 may be stored on and distributed to a computer readable recording medium, such as a CD-ROM and the like. For example, as shown in FIG. 8A, in the computer system having a CD-ROM drive 5, the CD-ROM drive 5 may read out the programs which are stored on a CD-ROM 50, and the CD-ROM drive 5 may store the programs in the memory 2.

Figure 8B:
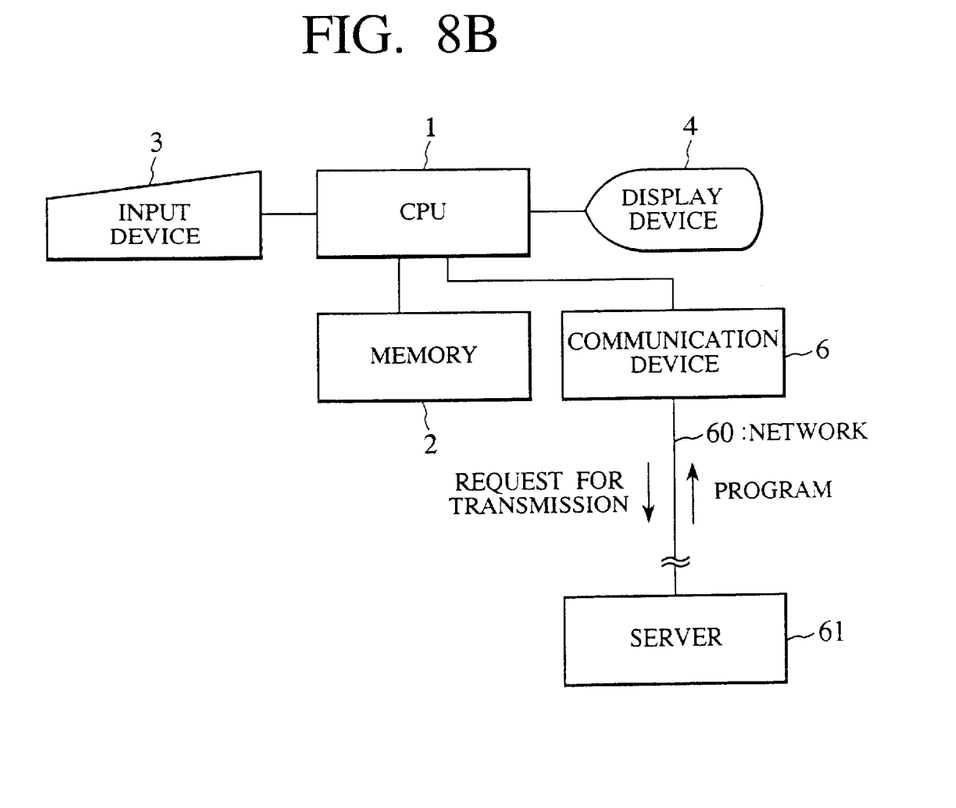

Further, the programs stored in the memory 2 may be supplied from a server on a communication network such as the Internet, etc., to a computer via the communication network. For example, as shown in FIG. 8B, in the computer system having a communication device 6, a server 61 may received a transmission request for a program from the communication device 6 via a 20 network 60. As soon as the server 61 receives the request, it may transmit the program via the network 60, and the communication device 6 may store the received program in the memory 2.

In the above-described embodiment, the multimedia content as the to-be-displayed computer software is pre-stored in the file storage section 100, which is realized on the memory 2. However, in employing the computer system shown in FIG. 8B, the communication device 6 may receive such multimedia content via the network 60, and the received multimedia content may be stored in the file storage section 100 whose area is allocated in the memory 2.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. H10-209332 filed on Jul. 24, 1998, and including specification, claims, drawings and summary. The disclosure of the above Japanese Patent Application is incorporated herein by reference in its entirety.

What is claimed is:

1. An object alignment controller for controlling an alignment of a plurality of objects contained in computer software and for displaying the objects on a display device, said controller comprising:

a memory which stores computer software containing the objects, an alignment of which is to be controlled, a structure of the objects contained in the computer software, a size of a displayable area for displaying on the display device the objects contained in the computer software, and a predetermined program; and a processor for, by executing said predetermined program stored in said memory, analyzing a structure of the objects contained in the computer software, and storing the structure in said memory, calculating a size of an area which is required for displaying the objects contained in the computer software in the structure stored in said memory, comparing the calculated size of the required area with the size of the displayable area which is stored in said memory, determining whether to change the structure of the objects based on said comparison result of the area sizes, changing the retained structure of the objects, when determined to change the structure of the objects, and storing the changed structure of the objects as a new structure of the objects in said memory.

2. The object alignment controller according to claim 1, wherein said processor allows the objects contained in the computer software to be displayed in the displayable area on the display device in accordance with the structure stored in said memory, when determined not to change the structure of the objects.

3. The object alignment controller according to claim 1, wherein said processor repeats determining whether to change the structure of the objects and changing the structure of the objects, until a comparison result that the calculated size of the required area is within the size of the displayable area is obtained, or all applicable changes are made in the structure.

4. The object alignment controller according to claim 1, wherein:

said processor analyzes an established alignment of the objects contained in the computer software, and represents the structure of the objects as an analyzed result in a tree structure; and said memory stores the structure of the objects represented in the tree structure.

5. The object alignment controller according to claim 1, wherein said processor changes the structure of the objects which is stored in said memory by changing a size of one or more objects in the structure.

6. The object alignment controller according to claim 1, wherein said processor changes the structure of the objects which is stored in said memory by changing the alignment of the objects in the structure.

7. An object alignment controller for controlling an alignment of a plurality of objects contained in computer software and for displaying the objects on a display device, said controller comprising:

area storing means for storing a size of a displayable area for displaying the objects contained in the computer software;

structure analyzing means for analyzing a structure of the objects contained in the computer software;

structure retaining means for retaining the structure of the objects which is analyzed by said structure analyzing means;

required area calculating means for calculating a size of an area required for displaying the objects contained in the computer software in the structure retained by said structure retaining means;

area comparing means for comparing the size of the required area which is calculated by said required area calculating means with the size of the displayable area which said area storing means stores;

structure change determining means for determining whether to change the structure of the objects based on a comparison result processed by the area comparing means; and structure changing means for changing, when said structure change determining means determines to change the structure of the objects, the structure of the objects which is retained by said structure retaining means and for storing the changed structure as a new structure of the objects.

8. The object alignment controller according to claim 7, wherein said structure change determining means determines whether the structure of the objects is changed by said structure change determining means, until the comparison result that the size of the required area calculated by said area comparing means is within the size of the displayable area is obtained, or all applicable changes are made in the structure.

9. An object alignment controlling method for controlling the alignment of a plurality of objects contained in computer software and for displaying the objects on a display device, said method comprising:

storing a size of an area for displaying on the display device the objects contained in the computer software;

analyzing a structure of the objects contained in the computer software;

retaining the analyzed structure of the objects;

calculating the size of the area required for displaying the objects which is contained in the computer software in the retained structure;

comparing the calculated size of the required area with the stored size of the displayable area;

determining whether to change the structure of the objects, based on a comparison result of the area sizes; and changing the structure of the retained objects, when determined to change the structure of the objects, and storing the changed structure as a new structure of the objects.

10. The object alignment controlling method according to claim 9, further comprising:

displaying the objects contained in the computer software in the displayable area on the display device in accordance with the retained structure, when determined not to change the structure of the objects.

11. The object alignment controlling method according to claim 9, wherein:

said determining and said changing repeat, until a comparison result that the size of the required area calculated by said area comparing means is within the size of the displayable area is obtained, or all applicable changes are made in the structure.

12. The object alignment controlling method according to claim 9, wherein:

said analyzing analyzes an established alignment of the objects contained in the computer software, and represents the structure of the objects as an analyzed result in a tree structure; and said retaining retains the structure of the objects which is represented as the analyzed result in the tree structure.

13. The object alignment controlling method according to claim 12, wherein said changing the structure of the objects is performed either one of process, such as insertion, deletion of a partial tree in a tree structure representing the structure, and re-connection of a node in the tree structure.

14. The object alignment controlling method according to claim 9, wherein said changing the retained structure of the objects is performed by changing a size of one or more objects contained in corresponding software.

15. The object alignment controlling method according to claim 9, wherein said changing the retained structure of the objects is performed by changing the alignment of the objects contained in the computer software.

16. The object alignment controlling method according to claim 15, wherein said changing the alignment of the objects includes rotating one or more objects contained in corresponding computer software.

17. A computer readable recording medium which records a program for controlling an alignment of a plurality of objects contained in computer software and for displaying the objects on a display device, said medium recording the program which makes a computer function as:

area storing means for storing a size of an area for displaying on the display device the objects contained in the computer software;

structure analyzing means for analyzing a structure of the objects contained in the computer software;

structure retaining means for retaining the structure of the objects which is analyzed by said structure analyzing means;

required area calculating means for calculating a size of an area required for displaying the objects contained in the computer software in the structure retained by said structure retaining means;

area comparing means for comparing the size of the required area which is calculated by said required area calculating means with the size of the displayable area which said area storing means stores;

structure change determining means for determining whether to change the structure of the objects, based on a resultant comparison processed by said area comparing means; and structure changing means for changing, when said structure change determining means determines to change the structure of the objects, the structure of the objects which is retained by said retaining means, and for storing the changed structure as a new structure of the objects.

18. The computer readable recording medium according to claim 17, wherein said structure change determining means determines whether the structure of the objects is to be changed by said structure change determining means, until a comparison result that the size of the required area which is calculated by said area comparing means is within the size of the displayable area is obtained or all applicable changes are made in the structure.

19. A program data signal embodied in a carrier wave, for controlling an alignment of a plurality of objects contained in computer software and for displaying the controlled alignment of the objects on a display device, said program data signal comprising segments for realizing:

an area storing function for storing a size of an area for displaying the objects contained in the computer software on the display device;

a structure analyzing function for analyzing a structure of the objects contained in the computer software;

a structure retaining function for the structure of objects which is analyzed by said structure analyzing function;

a required area calculating function for calculating a size of an area required for displaying the objects contained in the computer software in the structure retained by said structure retaining function;

an area comparing function for comparing the size of the required area which is calculated by said required area calculating function with the size of the displayable area which said area storing function stores;

a structure change determination function for determining whether to change the structure of the objects, on the basis of the comparing result of said area comparing function; and a structure change function for changing the structure of the objects contained by said retaining function when said structure change determination function determines to change the structure of the objects, and for storing the structure of the objects as a new structure of the objects.

20. The program data signal embodied in the carrier wave according to claim 19, wherein said structure change determination function determines whether to change the structure of the objects by said structure change determination function, until a comparison result that the size of the required area which is calculated by said area comparison function is within the size of the displayable area is obtained, or all applicable changes are made in the structure.

* * * * *